United States Patent [19]

Jeryan et al.

[11] 3,999,376
[45] Dec. 28, 1976

[54] ONE-PIECE CERAMIC SUPPORT HOUSING FOR A GAS TURBINE WITH A ROTARY REGENERATOR

[75] Inventors: Richard A. Jeryan, Detroit; Arthur F. McLean; Anthony Paluszny, both of Ann Arbor; Emil A. Pulick, Livonia, all of Mich.

[73] Assignee: Ford Motor Company, Dearborn, Mich.

[22] Filed: Jan. 24, 1975

[21] Appl. No.: 543,849

Related U.S. Application Data

[63] Continuation of Ser. No. 376,762, July 5, 1973, abandoned.

[52] U.S. Cl. .................. 60/39.32; 60/39.51 H; 60/39.66; 415/219 R
[51] Int. Cl.² ............... F02C 7/10; F02C 7/20
[58] Field of Search ......... 60/39.31, 39.32, 39.66, 60/39.51 H, 39.36; 415/214, 219 R, 138; 165/8, 9

[56] References Cited

UNITED STATES PATENTS

| | | | |
|---|---|---|---|
| 2,341,664 | 2/1944 | Schutte | 415/214 |
| 2,553,867 | 5/1951 | Parducci | 60/39.36 |
| 3,167,914 | 2/1965 | Savonuzzi | 60/39.51 H |
| 3,586,096 | 6/1971 | McLean | 165/8 |
| 3,635,577 | 1/1972 | Dee | 415/79 |
| 3,798,899 | 3/1974 | Hill | 60/39.32 |

FOREIGN PATENTS OR APPLICATIONS

| | | | |
|---|---|---|---|
| 857,378 | 11/1952 | Germany | 415/214 |

*Primary Examiner*—Carlton R. Croyle
*Assistant Examiner*—Thomas I. Ross
*Attorney, Agent, or Firm*—R. E. McCollum; Keith L. Zerschling

[57] ABSTRACT

A thin outer metallic housing surrounds and is spaced from a one-piece cylindrical ceramic liner that insulates, supports and houses high temperature and rotating parts of the engine, the end faces of the liner constitute rubbing seal surfaces against which are directly mounted ceramic core rotating regenerators, the liner and housing having aligned holes through which is mounted the inline hot gas flow path components.

22 Claims, 7 Drawing Figures

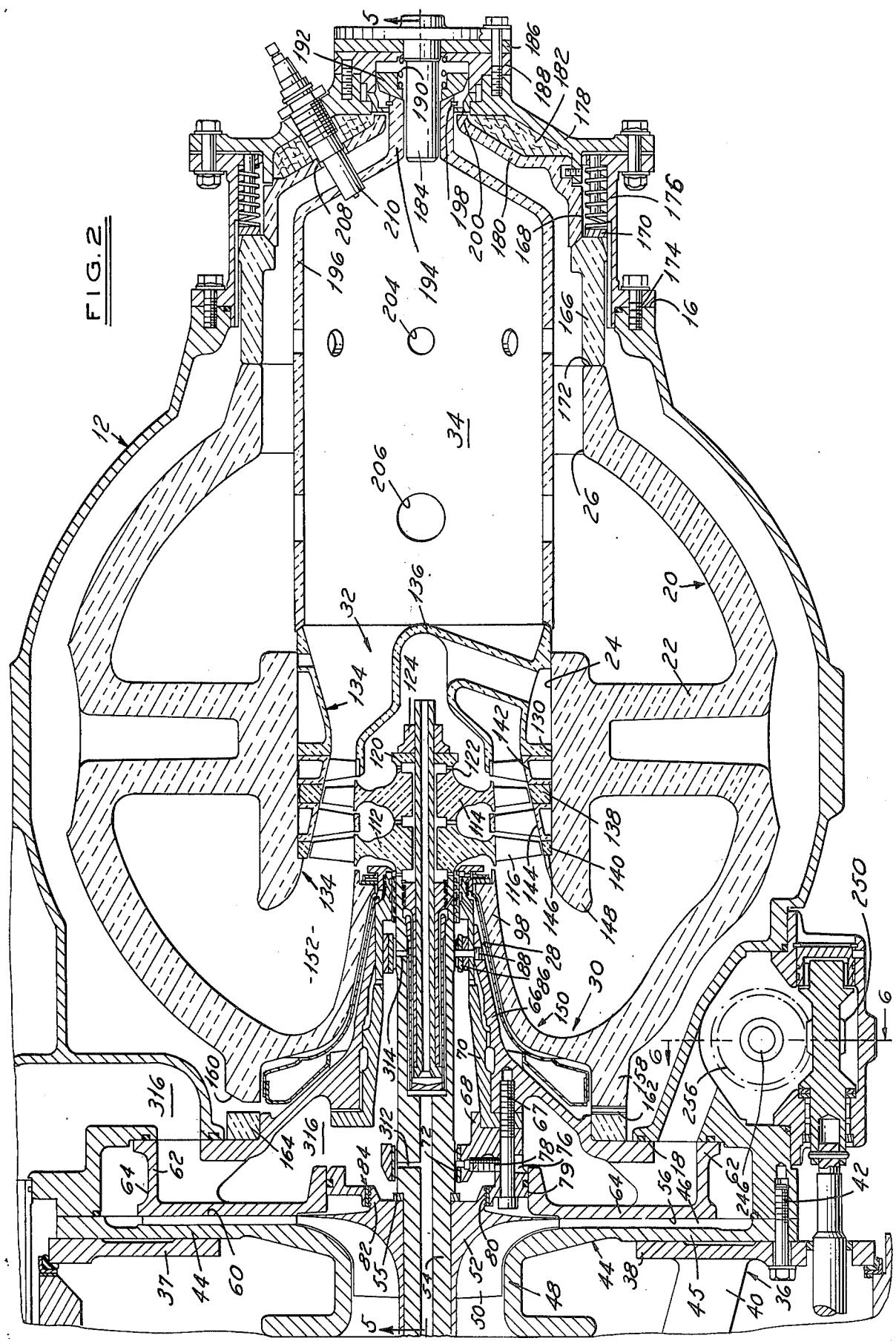

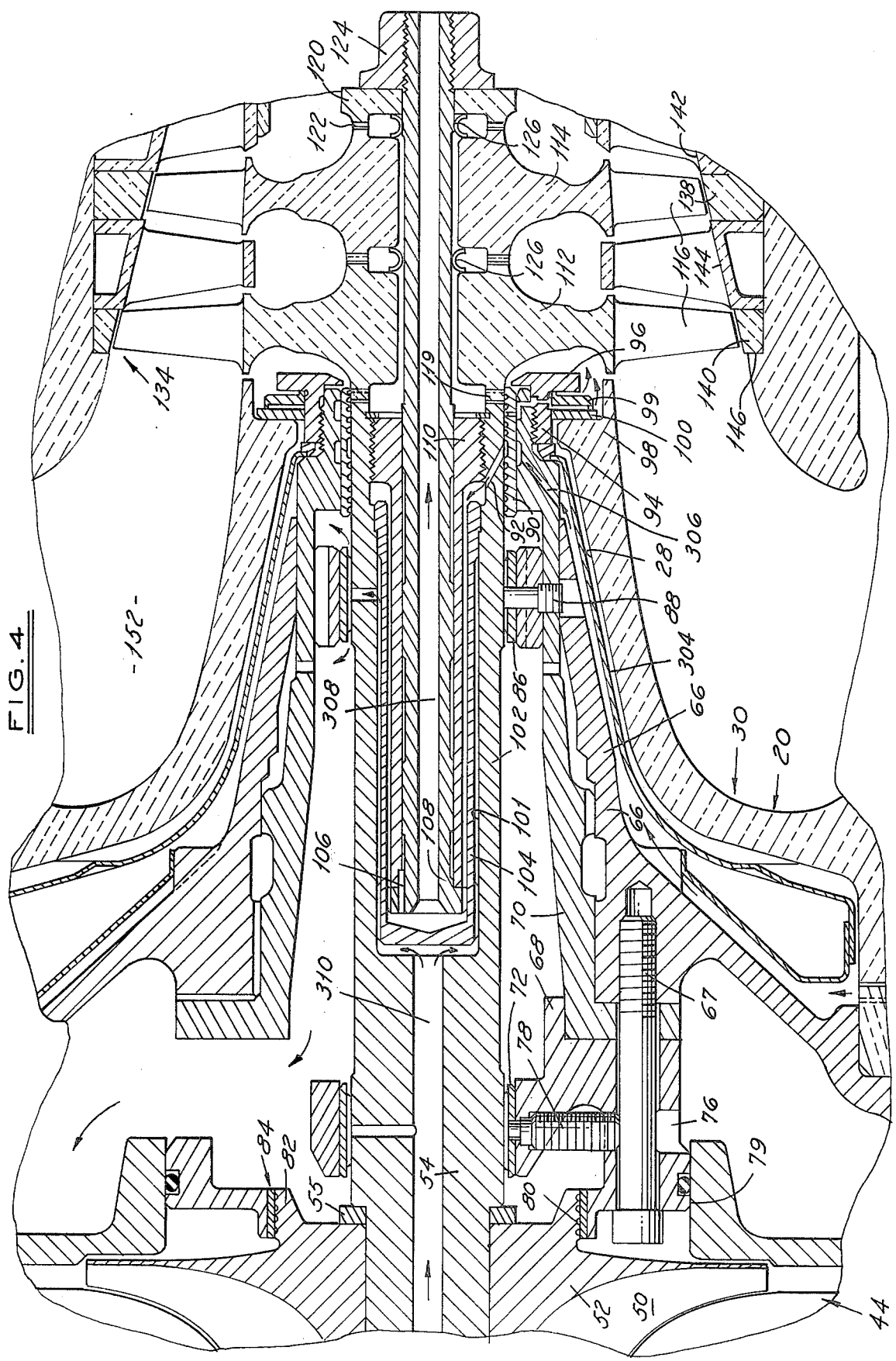

ONE-PIECE CERAMIC SUPPORT HOUSING FOR A GAS TURBINE WITH A ROTARY REGENERATOR

This is a continuation of application Ser. No. 376,762, filed July 5, 1973, now abandoned.

This invention relates to a low cost gas turbine engine construction. More particularly, it relates to a single shaft engine having an outer metallic housing of relatively thin construction enclosing and spaced from an inner one-piece ceramic housing. The ceramic housing is cylindrical and has the multi-function of supporting, housing, and insulating the high temperature gas flow path and parts from the outer housing. The end faces of the ceramic housing also provide integral rubbing seal surfaces against which are mounted rotary regenerators without the necessity of intermediate members.

In a conventional automotive gas turbine engine, the metallic hot flow path components generally are housed within a well insulated metallic main housing. In order to obtain high operating temperatures, exotic metals generally must be used. This is expensive, and also imposes severe limitations on the capabilities of the engine since the availability of such exotic materials is limited. Additionally, the use of ceramic disc-like regenerators in automotive installations requires expensive metallic seals between the rubbing surface of the metallic housing and the ceramic matrix face of the regenerator. The thermal expansion of the ceramic matrix and the thermal gradients between the ceramic and metallic components encourages flow leakages and failures of the seals because of distortion, etc. The use of a metallic main housing also requires additional ducting for passing compressor discharge air and exhaust gas flow through the regenerators.

The invention eliminates the above disadvantages and provides a low cost gas turbine engine construction by providing an inner line of a one-piece ceramic construction. It is cylindrical and houses the high temperature operating parts of the engine to not only provide support for them but also to fully insulate them from the outer metallic housing. Furthermore, the end faces of the ceramic liner provide integral rubbing seal surfaces against which the rotary ceramic regenerators can be directly mounted for rotation, thereby eliminating the need for very expensive and critical inner seals. The inner liner further provides the advantage of incorporating aerodynamic flow path passages within the inner housing per se as in integral part. An additional advantage of the inner liner is that it permits higher turbine exit temperatures, with a resultant improvement in engine size and fuel economy. Furthermore, the inner liner eliminates the need for outer housing insulation, the installation of which is a time consuming and laborious task; or, if insulation is provided, the inner liner provides betterheat retention and therefore improved economy. Again, the use of the inner liner provides a lower cost for the engine, which is a very important asset with respect to automotive power plants.

It is a primary object of the invention, therefore, to provide an automotive type gas turbine engine construction that is low in cost.

It is another object of the invention to provide a single shaft gas turbine engine construction that includes a one-piece ceramic cylindrical inner housing or liner that is spaced from an outer metallic housing and has the multi-function of supporting and housing and insulating the high temperature operating parts of the engine from the outer housing.

Another object of the invention is to provide an engine construction of the type described in which the end faces of the inner liner comprise integral rubbing seal surfaces against which are directly mounted a rotary ceramic regenerator of the disc-type without the intermediary of additional sealing members.

It is a still further object of the invention to provide a gas turbine engine construction as described above in which the inner liner has a central bulkhead that divides the liner into two back-to-back D-shaped sections defining integral flow passages, the bulkhead having a central aperture that supports and houses and insulates the turbine shrouds and rotors without the need for piston ring or other type seals.

It is another object of the invention to provide a compact engine assembly of the type described providing an in-line hot flow gas path eliminating the need for the usual plenum chambers between the combustion chamber and hot flow gas path.

Yet another object of the invention is to provide an engine construction including an inner ceramic housing or liner yieldably supported from an outer metallic housing in a way as to permit thermal growth of the outer housing.

Another object of the invention is to incorporate a turbine diffuser as an integral part of the inner liner structure and thus eliminate leakages.

Other objects, features and advantages of the invention will become more apparent upon reference to the succeeding detailed description thereof, and to the drawings illustrating the preferred embodiment thereof, wherein;

FIG. 2 is an enlarged cross-sectional view of the engine of FIG. 1 obtained by passing a vertical plane through a transverse axis of the engine;

FIG. 4 is an enlarged cross-sectional view of a portion of the FIG. 2 showing;

Figure 5:
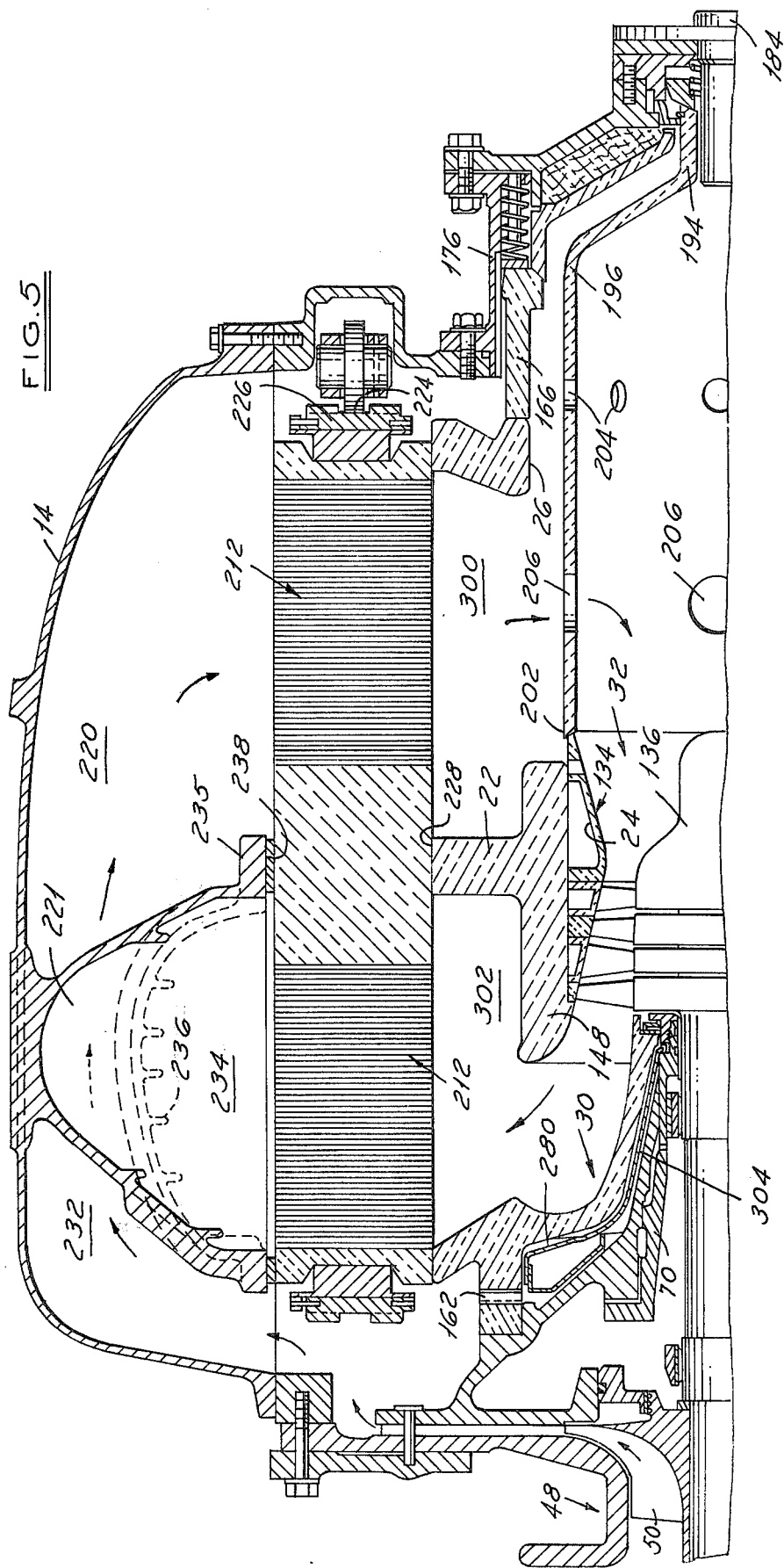
Figure 6:
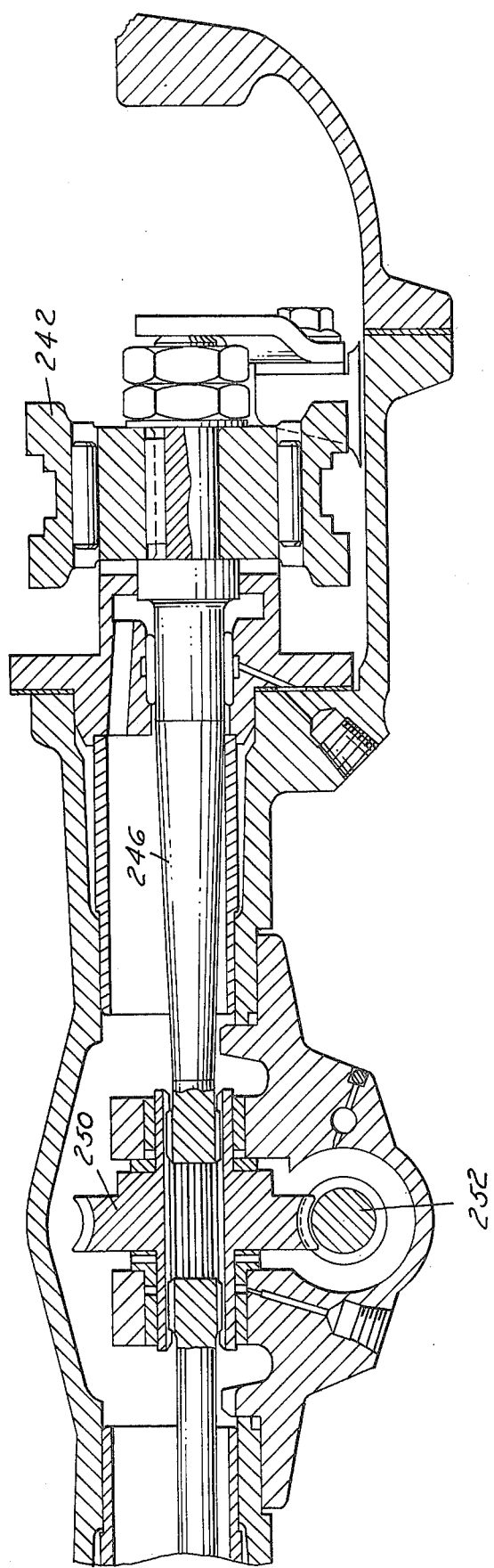
Figure 7:
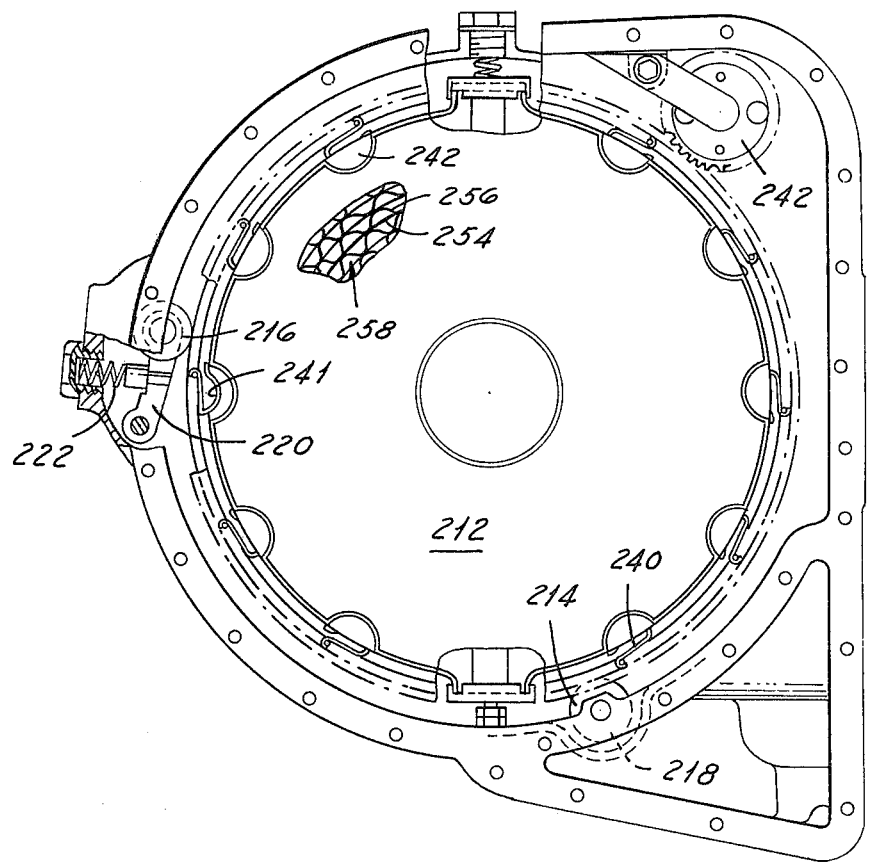

FIGS. 5 and 6 are cross-sectional views taken on planes indicated by and viewed in the direction of the arrows 5—5 and 6—6, respectively, of FIG. 2; and, FIG. 7 is an end elevational view of the engine with a cover removed.

Figure 1:
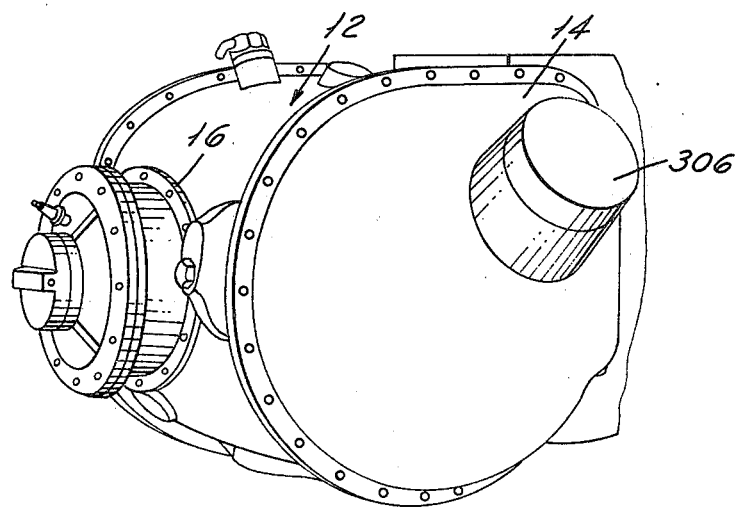
FIG. 1 is a perspective view of an engine constructed according to the invention.

As best seen in FIGS. 1 and 2, the single shaft gas turbine engine consists in general of an outer cylindrical thin metal housing 12 that is closed at opposite ends by a pair of cover member 14 (only one shown), and has a pair of aligned holes or apertures 16 and 18 in opposite sidewalls. Outer housing 12 is spaced from and encloses a one-piece ceramic inner liner or housing 20. The liner has a center partition or bulkhead 22 formed with a central opening 24. Opening 24 is aligned with similar openings 26 and 28 in opposite sidewalls for cooperation with the outer housing apertures 16 and 18. Within the aligned apertures in an in-line arrangement are mounted the rotating and hot parts of the engine. These include a compressor section 30, turbine rotor section 32, and a combustion can or chamber 34, the latter as well as the compressor section projecting out through the aligned apertures, as indicated.

More specifically, the closure member for the right-hand outer housing aperture 18, as seen in FIG. 2, is an annular metal bulkhead 36. The bulkhead consists of a pair of axially spaced, washer-like plates 37 (only one shown) that are interconnected by a number of struts 40 to define an air inlet passage to the engine. Secured to the back face of plate 37 by bolts 42, is a multi-function annular member 44. It is formed at its outer radial portion as an annular pie-shaped diffuser 46 and at its inner curved portion as an outer annular shroud member 48. The shroud surrounds and encloses the curved circumferentially spaced blades 50 of a centrifugal type compressor 52. The compressor is secured as by a press fit to the single engine driveshaft 54, and axially located by a spacer 55.

The diffuser has wedge-shaped air passages 56 defined by circumferentially spaced pie-shaped members 58 and the front wall 60 of an annular bearing support member 62. Member 62 forms one part of a three member bearing support assembly for aligning and locating the single driveshaft 54.

The outermost member 62 has a flange portion 64 and a rearwardly extending conical sleeve portion 66. Bolts 67 secure member 62 to the other two bearing support sleeve members 68 and 70. One internal diameter of member 68 has a stationary bearing support surface within which is mounted a floating oil type sleeve bearing 72 rotatably mounting shaft 54. A vertical pocket 76 in support 68 contains a bearing anti-rotation pin 78 that projects into the bearing as shown. The outer diameter 79 of member 68 has a sealed engagement with the inner diameter of bearing member 62, the rightward edge of which serves as a stationary shroud portion for centrifugal compressor 50. The other inner flanged portion 80 of member 68 cooperates with an extension 82 of the compressor to form a labyrinth seal 84.

Bearing support portion 70 extends rearwardly for the support of a second floating oil type bearing 86. A bearing anti-rotation pin 88 is secured to outer bearing member 62 and projects through an aperture in sleeve bearing member 70 into the bearing per se. The rearwardmost end of sleeve 70 cooperates with a labyrinth sleeve 90 that is press fitted into it. An air pressurization passage 92 is provided for cooperation with a relief portion of the driveshaft 54, in a manner to be described.

The outer diameter of bearing support member 70 is threaded as indicated at 94 for receiving a nut 96 that axially ties the bearing support members against the one end 98 of the one piece ceramic inner line 20. Located between the nut and the inner liner is a flat spring 99 of say, a 300 pound force, for example, abutting an annular shim 100 sized to give the desired preload on the forward end 98 of the inner line.

The driveshaft 54 has a recess 101 within which the driveshaft is telescopically extended. More specifically, press fitted and brazed to the outer sleeve portion 102 of the driveshaft is an inner second sleeve portion 104 that forms an oil feed annulus 105 through which oil flows as will be described later. A shaft 110 is threaded to sleeve 102 extends forwardly and is keyed at 106 to a further bolt portion 108. In effect, this doubling back of the shaft reduces the shaft length by essentially two times to conserve space while still providing the long shaft elasticity.

The driveshaft extension 108 exends rearwardly to be driven by a pair of turbine rotors 112 and 114. Each constitutes, in this case, a cast ceramic rotor having a plurality of circumferentially spaced blades 116 integral with its outer periphery. The rotors are cast with curvic coupling faces 118 at their axial edges. These mate at one end with a formed curvic coupling 119 on the end of driveshaft sleeve portion 102, and at the rearward end, with an annular washer 120 provided with a curvic coupling face 122. The washer axially locates the rotors against the end of driveshaft 54 by means of a nut 124 threaded on the end of shaft 110. A number of seal assemblies 126 are located between shaft 110 and curvic couplings 118 in the recesses shown.

Figure 3:
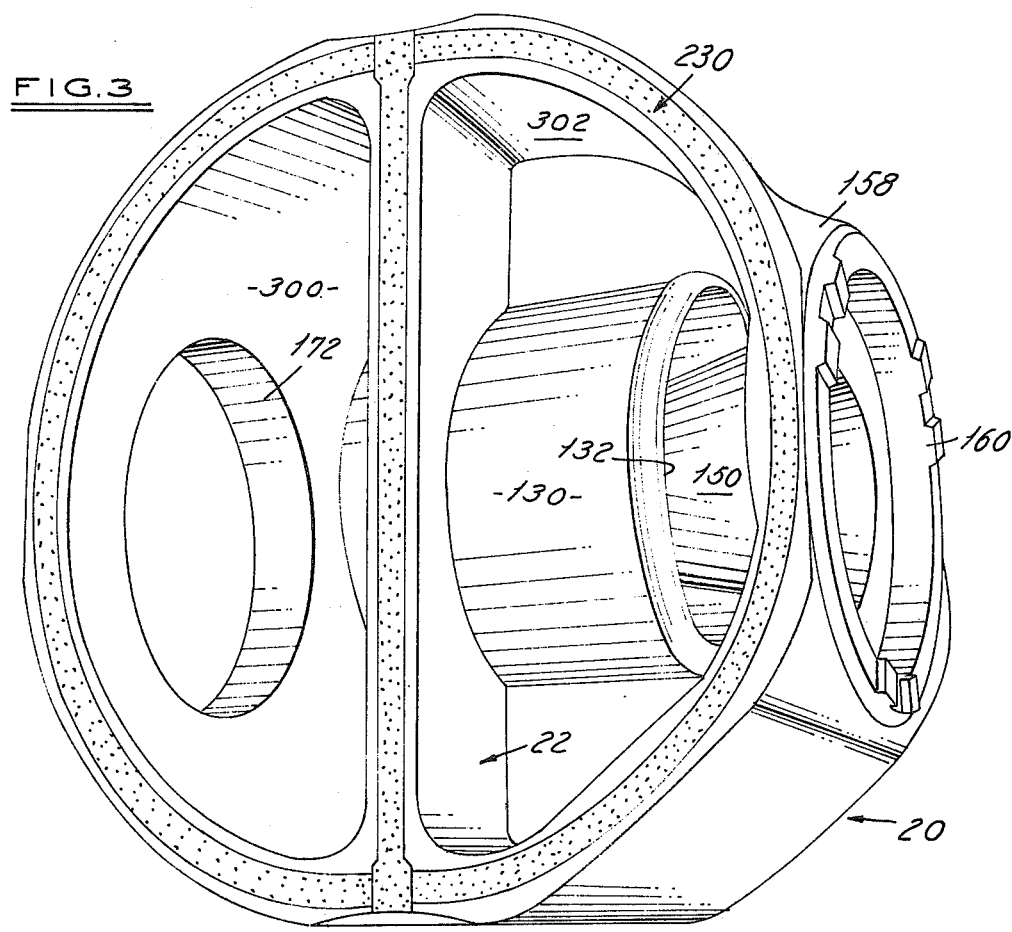
FIG. 3 is an isometric view of the inner housing or liner.

Referring now to FIGS. 2 and 3, the rotating as well as hot gas flow portions of the engine are for the most part enclosed within the one-piece ceramic liner 20. As stated previously, the liner is cylindrical with a center partition or bulkhead 22 formed with a transverse sleeve portion 130 defining an aperture 132. The inner diameter of sleeve 130 constitutes a bearing surface against which is directly mounted the outer diameter of an assembly of an outer stationary shroud 134 and an annular inlet nose cone 136. Axially spaced portions 138 and 140 of the shroud provide mounting recesses within which annular stator blade shroud portions 142 and 144 are contained, the latter cooperating with the rotor blades 116. The end shroud portion 140 is mounted against a shoulder 146 on a forward extension 148 of sleeve 130. The latter, together with the conically formed radially inner portion 150 of the inner liner constitutes an integral ceramic exhaust gas diffuser section 152. It will thus be seen that the nose cone shroud portions define an aerodynamic hot flow path for passage of the exhaust gases past the stator and rotor blades into the exhaust diffuser section.

The forwardmost portion 158 of the inner liner, as best seen in FIG. 3, is formed with a curvic coupling face 160 that mates with similar teeth 162 formed on an annular ring 164. The latter is pressed on and bolted to the bearing support member 62. This latter attachment axially and radially locates the liner gasifier assembly.

The one-piece inner liner 20 is yieldably supported at its rearward end by an annular spacer 166 preloaded by a number of circumferentially spaced coil spring units 168 bearing against a shim 170. As best seen in FIGS. 2 and 3, the spacer 166 abuts the inner liner adjacent the opening 172 in the rear sidewall and within a flanged opening 174 in the sidewall of main housing 16. Bolted to the main housing is an annular spring support member 176, which is also bolted at its rearward portion to a conical combustion can support assembly 178. A conical heat shield 180 is secured to the support 178 with insulating material 182 positioned between.

The assembly 178 includes a fuel nozzle member 184, a spacer 186, and an adapter 188 against which is seated a spring 190. Preloaded by the spring 190 is a conical positioning ring seat 192 against which is engaged the sleeve end 194 of ceramic one-piece combustion can 196. The combustion can is located axially in one direction by a snap ring 198 cooperating with a retainer 200. The combustion can is a one-piece ceramic construction, the rearward end of which abuts the end of the nose cone shroud 134. Conventional primary and secondary air holes 204 and 206 are provided in the ceramic can 196, as well as an opening 208 through which projects a spark plug or igniter 210.

It will be noted that with the construction as described, the inner liner 20 is mounted at the forward end of the engine against the curvic coupling 160 to axially and radially locate it and the rotating parts of the engine, and that the rear end of the liner is spring loaded by the coil spring units 168 and the spring loaded conical seat 192. This permits thermal growth of the metallic outer housing 12 with respect to ceramic liner 20 without causing a cracking of the inner liner, and it also permits a shifting of the elements relative to one another for correct axial alignment and sealing purposes. It also is to be noted that the construction described provides an in-line hot flow path with the hot exhaust gases passing directly from the combustion can 196 past the nose cone assembly 136 against the rotor blades 116 and out into the exhaust diffuser 152, without the intermediary of the usual plenums and ducting. Fuel to the combustion can is introduced in a conventional manner.

As best seen in FIGS. 3, 5 and 7, the end faces of the one-piece ceramic inner line 20 constitute bearing surfaces against which are directly mounted ceramic disc type axial flow regenerators 212. In previous metal constructions, it was always necessary to provide rubbing seals between the rotating and stationary portions; however, in this instance, the end face of the ceramic inner liner constitutes a rubbing seal surface thereby eliminating the need for such seals and minimizing the leakage losses. More specifically, the central bulkhead or partition 22 of the inner liner 20 divides the inner liner into a pair of back-to-back D-shaped sections (FIG. 3) which define air and gas passages formed integral with the liner.

As seen in FIGS. 5 and 7, just within each of the end face portions of the outer metal housing are mounted two circumferentially spaced rollers 214, 216 on which the disc-like regenerator 212 is mounted and supported. Roller 214 has a ball bearing mount in a pocket 218 formed in the outer housing. Roller 216 is rotatably mounted on the end of a lever 220 pivoted mounted on the housing and loaded by a spring 222 in an inward direction. As best seen in FIG. 5, rollers engage in a central recessed portion 224 of a metallic ring gear 226 secured to the outer periphery of the ceramic regenerator 212, in a manner to be described.

The regenerator is held axially against the rubbing seal surface 228 of the inner liner by a cover 14 enclosing the end face of the metal housing. The face of the liner preferably is sprayed with a lubricant 230, as indicated. Cover 14, like the inner liner 20, is formed with air and gas passages 232 and 234. It is also formed with a metallic D-shaped end portion 235 for cooperation with the outlet portion of the regenerator 212 in a manner to be described. A metallic D-shaped rubbing seal or shoe 238 is provided between the mating end portion 235 and the face of the ceramic regenerator matrix. The internal portion of cover passage 232 is formed with heat radiating ribs 236 for transfer of the hot exhaust gas heat in passage 234 to the incoming compressed air in passage 232.

A metallic ring gear 226 is secured to the outer periphery of the regenerator disc in the manner shown in FIG. 7, and more fully shown and described in FIG. 1a of U.S. Pat. No. 3,401,741. In brief, a number of C-shaped clips 240 are yieldably retained in recesses 241 in the outer surface of a number of ceramic plugs 242 cemented to the periphery of the ceramic regenerator 212. The clips have a hooked end engagement with portions of the metallic ring gear 226 for a yieldable drive connection between.

The regenerator ring gear 226 is adapted to be driven in this case by a pinion gear 242 secured to the half axle 246. The latter is driven through worm gearing 250 and a second shaft 252 by suitable reduction gear drive from the main driveshaft 54, in a conventional manner.

Further details of construction and operation of the regenerator are not given since they are of a known construction and are believed to be unnecessary for an undestanding of the invention. Suffice it to say that the matrix of the regenerator could consist of alternating flat and corrugated annular ceramic bands 254 and 256, for example, providing axial passages 258 for the flow of gas and air through them and the transfer of heat from the passage walls to the compressor discharge air, in a known manner.

In overall operation, in brief, driveshaft 54 is rotated to supply air through the inlet to the centrifugal compressor 52. This compressed air passes through the diffuser 56, and, as best seen in FIG. 5, passes around the outside of the ceramic inner liner 20 and into the outer housing cover passage 232. From this point, the compressed air passes through a connecting channel 221 behind the hot exhaust gas passage 234, absorbing any heat transferred through the ribs 236. The compressed air then passes through one-half of the rotary regenerator matrix 212 and into the rearward passage portion 300 defined by the bulkhead 22 and outer walls of the inner liner 20. From this point, the compressed air passes through the primary and secondary holes 204 and 206 of the combustion can 34 to combine with the fuel from nozzle 184 and be ignited by the spark plug 210. The discharge of hot exhaust gases directly past the nose cone assembly 136 against the rotor blades 116 rotates the same to transmit power to the driveshaft 54. This power in turn is transmitted by means not shown through reduction gearing and the conventional differential to the drivewheels of a motor vehicle.

The exhaust gas is passed out through the exhaust diffuser 152 and into the integral passage 302 formed by the inner liner bulkhead 22 and its outer walls. The hot exhaust gases then pass through the other half portion of the regenerator 212 and out into passage 234 to be discharged into the atmosphere through the outlet 306 shown in FIG. 1. The rotation of the regenerator 212 causes one-half of the matrix to be heated by the hot exhaust gases in passages 302 so that when it is rotated to a position whereby the compressor discharge air in passage 220 enters that portion of the regenerator, the heat will be transferred to the air in a manner like that through the rib 236. The cycle then begins repeating itself.

As stated above, the compressor discharge air passes out of the diffuser into the combustion can. Simultaneously, as seen in FIG. 5, this air under pressure is admitted to the space between the inner liner 20 and outer housing 12 placing the liner under compression. This cooler air also flows through the teeth of the curvic coupling assembly down on the inside of a conical metal heat shield member 304 into the passage 306 in bearing support member 70. The cooling air under pressure then passes into the center of the labyrinth seal 90. Since the air is at a higher pressure than the exhaust gases, it passes axially outwardly from the seal in both directions. The air passing rearwardly towards the rotors is bled off to cool the flat spring 99 which provides a preload to the conical portion of the inner liner 20. The air passing forward from the labyrinth seal passes to the oil sump from bearing 86. The passage 92 carries air down the spaces between the driveshaft extensions to a central bolt cooling passage 308, from whence it passes out into the engine ambient air section.

Similarly, engine oil flow is provided from a central passage 310 in driveshaft 54 through passages 312 and 314 to bearings 86 and 72. Oil flows also from a passage (not shown) in the struts 40 to the gear 250, and then to the large flow passage 316 and out to the oil sump (also not shown).

From the foregoing, it will be seen that the invention provides a lower cost turbine engine construction that includes a single one-piece ceramic inner liner yieldably mounted within a metallic outer housing in a manner permitting thermal growth and shifting of the outer housing relative to the inner lining, and also the inner lining surrounding and supporting and thermally insulating the hot gas and airflow portions of the engine from the outer housing. Furthermore, it will be seen that the ceramic inner liner provides hot gas and airflow passages integral with its construction, and that the end faces of the cylindrical liner serve as rubbing seal surfaces against which rotary ceramic regenerators are directly rotatably mounted without the intermediary of other sealing members that increase losses due to fluid leakages. It will also be seen that the outer metallic cover portions are provided with integral air and gas passages and means to transfer the heat from the hot gas to the cooler air in an automatic manner to increase the operating efficiency of the engine.

While the invention has been illustrated and described in its preferred embodiment, it will be clear to those skilled in the arts to which it pertains that many changes and modifications may be made thereto without departing from the scope of the invention.

We claim:

1. A gas turbine engine construction including a compressor section having a compressor, a unitary cylindrical self-insulating support housing of ceramic material having apertures in diametrically opposite portions of the sidewalls for receiving therethrough and supporting in axial alignment the compressor and the high temperature parts of the engine including an assembly of a combustion chamber connected to a high temperature turbine rotor section providing an in-line hot gas flow path, the housing having open ends divided by a central partition extending axially from end to end, the central partition defining separate compressor discharge air and exhaust gas flow passages, the end face of at least one end of the housing constituting a bearing surface for the contiguous engagement thereagainst and rotation thereon of a flat disc type rotary regenerator to permit the passage of air through a portion of the regenerator in a direction into the compressor discharge passage and for the flow of the exhaust gases in the opposite direction through another portion of the regenerator from the exhaust gas passage defined by the housing and central partition, the ceramic housing thereby having the multiple functions of housing and supporting and insulating the high temperature parts as well as providing a mounting and rubbing seal surface against which a regenerator can be contiguously rotatably mounted.

2. An engine as in claim 1, including a disc type regenerator rotatably mounted with its matrix flat against an end face of the housing.

3. An engine as in claim 1, including a rotatable disc type regenerator mounted flat against each of the end faces of the housing for cooperation therewith and with the end face of the control partition, the partition end face extending axially to a point flush with the end face of the housing.

4. An engine as in claim 1, wherein the partition is formed with a sleeve aligned with the apertures, the sleeve being extended rearwardly and that portion of the housing defining an adjacent sidewall aperture being extended forwardly whereby the sleeve and latter portion together define an exhaust gas diffuser integral with the housing.

5. An engine as in claim 1, including means in the compressor section engageable with the housing for centering the same with respect to the assembly to maintain accurate alignment of the parts, the last mentioned means comprising a curvic coupling having curved tooth annular members formed on the housing and a portion of the compressor section for meshing cooperation.

6. A single shaft gas turbine engine construction comprising,
    an assembly having a compressor driveshaft with forward and rearward ends, a compressor section including a compressor fixed to the driveshaft at its rearward end, high temperature parts including first and second turbine rotors both fixed to the driveshaft at its forward end, radially spaced inner and outer stationary shroud members axially aligned with and located forward of and cooperating with the turbine rotors to define a hot exhaust gas flow path therebetween, the high temperature parts also including a combustion chamber axially aligned with and forward of and engaging the shroud members to together with the turbine rotors define an in-line aerodynamic flow path,
    a one-piece ceramic cylindrical longitudinally extending inner housing liner having a central partition extending along the longitudinal axis of the liner dividing the liner into a pair of fluid passages extending from end to end of the liner for the separate passage of engine gases and compressor discharge air through the engine, the partition being formed with a central transversely extending sleeve portion, the sidewall portion of the liner partially defining each fluid passage having an opening therein having an axis essentially at right angles to the longitudinal axis of the liner, and end openings of the sleeve portion being axially aligned with the sidewall portion openings,
    the assembly being mounted within and between the openings and extending out through opposite liner sidewall portions, the sleeve portion locating and housing the turbine rotors and shroud members, an outer annular metallic housing spaced from the inner liner, the inner liner supportng and housing and insulating the engine high temperature parts from the outer housing, and passage means conducting compressor discharge air under pressure to the space between the ceramic liner and metal housing for maintaining the ceramic liner under compression.

7. An engine as in claim 6, the internal surface of the central sleeve portion constituting a ceramic sealing surface for the external portions of the turbine rotors enclosed thereby.

8. An engine as in claim 7, the central sleeve portion being extended rearwardly to form a burst protecting shroud around the outside of the turbine rotors.

9. An engine as in claim 6, including means connecting the ceramic liner and metal housing in a yielding manner permitting growth and movement of the metal housing relative to the ceramic liner in response to temperature changes and other forces.

10. An engine as in claim 9, including spring means yielding interconnecting the inner liner and outer housing.

11. An engine as in claim 6, and including means secured to the compressor section engagable with the inner liner for centering the same with respect to the assembly.

12. An engine as in claim 11, wherein the last mentioned means comprises a curvic coupling having curved tooth annular members formed on the inner liner and a portion of the compressor section for meshing cooperation.

13. An engine as in claim 6, including means mounting that turbine rotors, and further passage means conducting the compressor discharge air to the turbine rotor mounting means to cool the same.

14. An engine as in claim 6, wherein the sleeve portion is extended rearwardly towards one liner sidewall portion opening, the latter opening being extended forwardly towards and radially within the sleeve portion to together form an exhaust gas diffuser integral with the liner and rearwardly of the turbine rotors.

15. An engine as in claim 6, including spring means between the outer housing and one sidewall portion of the liner, and curvic coupling means between an opposite sidewall portion of the liner and that portion of the compressor section rearwardly of the liner for centrally locating the assembly with respect to the liner and outer housing and permitting thermal growth of the outer housing relative to the liner.

16. A gas turbine engine construction comprising a compressor, at least one rotary disc type regenerator, first means conducting the hot compressor discharge air through a portion of the regenerator, a combustion chamber supplied with fuel, second means connecting the compressor discharge air discharged from the regenerator to the combustion chamber, a rotating turbine rotor having blade members thereon, a stationary shroud member enclosing the turbine rotor and spaced therefrom for the flow of hot gas therebetween, third means defining a hot gas flow path from the combustion chamber to and past the turbine rotor, fourth means connecting the hot exhaust gases from the turbine rotor to another portion of the regenerator for flow therethrough to heat the same and the compressor discharge air, the turbine rotor and combustion chamber being in axial alignment with each other and linearly in the order named to provide a compact assembly, the axial alignment of the combustion chamber and turbine rotor defining an in-line hot gas flow path, an outer metal housing enclosing the engine, a compact one-piece ceramic inner support housing spaced from the outer housing and enclosing and supporting and insulating the high temperature turbine rotor and combustion chamber of the engine from the outer housing, the inner housing being cylindrical and havng apertures in diametrically opposite sidewall portions, the assembly extending through and between the apertures, the inner housing including a central partition dividing the inner housing into two sections, the partition having an aperture, the partition and sidewall apertures being axially aligned, the partition aperture being defined by a sleeve integral with the partition and providing an internal sealing surface enclosing and supporting the shroud.

17. An engine as in claim 16, wherein the sleeve is extended rearwardly to form the outer shroud of an exhaust gas diffuser, and one wall of the inner housing defining one aperture is extended inwardly of the inner housing and radially inwardly of the outer shroud to form an inner exhaust gas diffuser shroud.

18. A gas turbine engine construction comprising a compressor, at least one rotary disc type regenerator, first means conducting the hot compressor discharge air through a portion of the regenerator, a combustion chamber supplied with fuel, second means connecting the compressor discharge air discharged from the regenerator to the combustion chamber, a rotating turbine rotor having blade members thereon, a stationary shroud member enclosing the turbine rotor and spaced therefrom for the flow of hot gas therebetween, third means defining a hot gas flow path from the combustion chamber to and past the turbine rotor, fourth means connecting the hot exhaust gases from the turbine rotor to another portion of the regenerator for flow therethrough to heat the same and the compressor discharge air, the turbine rotor and combustion chamber being in axial alignment with each other and linearly in the order named to provide a compact assembly, the axial alignment of the combustion chamber and turbine rotor defining an in-line hot gas flow path, an outer metal housing enclosing the engine, a compact one-piece ceramic inner support housing spaced from the outer housing and enclosing and supporting and insulating the high temperature turbine rotor and combustion chamber of the engine from the outer housing, the inner housing being cylindrical and having apertures in diametrically opposite sidewall portions, the assembly extending through and between the apertures, the inner housing including a central partition dividing the inner housing into two sections, the partition having an aperture, the partition and sidewall apertures being axially aligned, the second and fourth means including passages formed as an integral part of the inner housing between the inner housing walls and partition.

19. A gas turbine engine construction comprising a compressor, at least one rotary disc type regenerator, first means conducting the hot compressor discharge air through a portion of the regenerator, a combustion chamber supplied with fuel, second means connecting the compressor discharge air discharged from the regenerator to the combustion chamber, a rotating turbine rotor having blade members thereon, a stationary shroud member enclosing the turbine rotor and spaced therefrom for the flow of hot gas therebetween, third means defining a hot gas flow path from the combustion chamber to and past the turbine rotor, fourth means connecting the hot exhaust gases from the turbine rotor to another portion of the regenerator for flow therethrough to heat the same and the compressor discharge air, the turbine rotor and combustion chamber being in axial alignment with each other and linearly in the order named to provide a compact assembly, the axial alignment of the combustion chamber and turbine rotor defining an in-line hot gas flow path, an outer metal housing enclosing the engine, a compact one-piece ceramic inner support housing spaced from the outer housing and enclosing and supporting and insulating the high temperature turbine rotor and combustion chamber of the engine from the outer housing, the inner housing being cylindrical and having apertures in diametrically opposite sidewall portions, the assembly extending through and between the apertures, the inner housing including a central partition dividing the inner housing into two sections, the partition having an aperture, the partition and sidewall apertures being axially aligned, the partition extending axially to be flush with the end faces of the inner housing, and means mounting a regenerator having a ceramic matrix flat against each of the end faces of the inner housing and partition for rotation of the regenerator directly against the inner housing and partition end faces.

20. An engine as in claim 19, the outer housing including a cover member overlying the regenerator and forming therebetween portions of the first means, and metallic rubbing seal means between the cover member and regenerator adjacent face.

21. A gas turbine engine construction comprising a compressor section having a compressor, at least one rotary disc type regenerator, first means conducting the hot compressor discharge air through a portion of the regenerator, a combustion chamber supplied with fuel, second means connecting the compressor discharge air discharged from the regenerator to the combustion chamber, a rotating turbine rotor having blade members thereon, a stationary shroud member enclosing the turbine rotor and spaced therefrom for the flow of hot gas therebetween, third means defining a hot gas flow path from the combustion chamber to and past the turbine rotor, fourth means connecting the hot exhaust gases from the turbine rotor to another portion of the regenerator for flow therethrough to heat the same and the compressor discharge air, the turbine rotor and combustion chamber being in axial alignment with each other and linearly in the order named to provide a compact assembly, the axial alignment of the combustion chamber and turbine rotor defining an in-line hot gas flow path, an outer metal housing enclosing the engine, a compact one-piece ceramic inner support housing spaced from the outer housing and enclosing and supporting and insulating the high temperature turbine rotor and combustion chamber of the engine from the outer housing, the inner housing being cylindrical and having apertures in diametrically opposite sidewall portions, the assembly extending through and between the apertures, a curvic coupling interconnecting one side of the inner housing and the compressor section for centrally locating the two, and spring means yieldable interconnecting the opposite side of the inner housing to the outer housing and further centering the inner housing.

22. An engine as in calim 21, including further means connecting the outer housing to one end of the combustion chamber.

* * * * *